Nov. 4, 1941.   E. W. KELLOGG   2,261,387
SOUND RECORDING
Filed Jan. 2, 1940
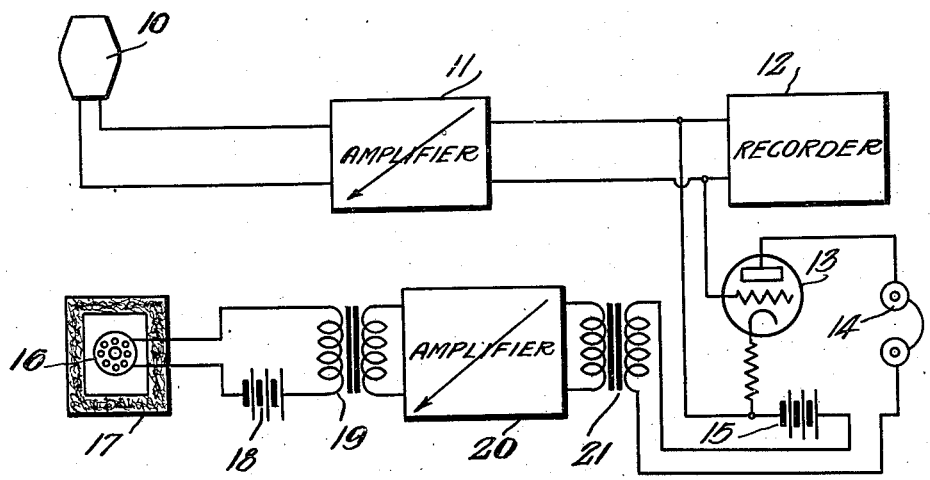
Inventor
Edward W. Kellogg
By
Attorney Patented Nov. 4, 1941

2,261,387

UNITED STATES PATENT OFFICE 2,261,387

SOUND RECORDING

Edward W. Kellogg, Moorestown, N. J., assignor to Radio Corporation of America, a corporation of Delaware Application January 2, 1940, Serial No. 312,080

5 Claims. (Cl. 179—100.1)

This invention relates to sound recording and more particularly to the monitoring of sound recording in which a thermionic amplifier is used.

In monitoring sound recording in which an amplifier is used, the monitoring is usually accomplished by earphones or a loudspeaker separated from the sound source. The sound is picked up by a microphone or a plurality of microphones at the source, is amplified and is transmitted to the recording apparatus, which may be of any appropriate type, such as film, disc or telegraphone. Between the amplifier and the recording apparatus there is usually connected a pair of earphones so that the recordist can determine the volume level of the recording and regulate the amplification accordingly.

The usual procedure in this respect has a number of disadvantages. The recordist and the recording apparatus are usually located in a sound-proof room to eliminate any extraneous noises, and the recordist, therefore, has no reference level in relation to which he can determine the loudness of the recording. Even if recording is done in the open extraneous noises are largely excluded by the earphones. The amplitude of the modulation is usually indicated by meters, but this is not entirely satisfactory for the reason that if peak reading meters are used, they do not indicate the average level of audibility, while if meters reading the average level are used, they do not properly indicate the peaks, which may be uncomfortably loud, while neither type satisfactorily indicates the minimum signal. When the recordist first enters the sound-proof room or applies the earphones, his ears have been rendered comparatively insensitive by outside noises. As the recording goes on, however, the sensitiveness of his ears increases, and he has a tendency to permit the fainter sounds to become so weak that they will not be satisfactorily recorded. In some instances, the lack of other sounds in the recording room causes the sounds from the monitor phones to seem extremely loud, and the recording level is brought so low as to render proper reproduction thereof difficult.

In the method and apparatus of the present invention, I avoid the foregoing difficulties by providing a background signal of constant intensity as a reference level so that the recordist may at all times be able to determine the relative loudness of the recorded sounds. This reference signal may, for example, be of such loudness that any recording which does not stand out clearly against the reference signal is not loud enough. On the other hand the reference signal may, if desired, serve to give an indication of suitable maximum level, by observing the condition that any recording which completely obscures it is too loud. It is preferable that this reference signal shall resemble the character of noise which is likely to be heard in the final reproduction, such as phonograph needle scratch or film graininess. A sound like a soft "hiss" is preferable to a buzz or a musical tone.

One object of the invention is to provide an improved monitoring apparatus for sound recording.

Another object of my invention is to provide an apparatus which will make the recordist conscious of the fact, whenever increased amplification is needed.

Another object of the invention is to provide an improved method of monitoring sound recording.

Another object of the invention is to provide an apparatus which will give a reference signal of constant loudness for the recordist.

Another object of the invention is to provide an apparatus in which the recordist needs only to determine the relative loudness of a signal rather than the absolute loudness thereof in order to secure proper recording.

Other and incidental objects of the invention will be apparent to those skilled in the art from a reading of the following specification and an inspection of the accompanying drawing in which The single figure is a schematic diagram of a recording channel constructed in accordance with the invention.

A conventional recording channel is generally indicated by the microphone 10, the amplifier 11 and the recorder 12. As many microphones as are desirable may, of course, be used, and the amplifier may be composed of the usual assembly of voltage and power amplifiers, attenuators, etc. The recorder may be of any appropriate type actuated from the output of the amplifier. Between the amplifier 11 and the recorder 12 there is connected an isolating tube 13 which prevents the transmission of any reference signal into the recording channel. The output from this isolating tube passes to the monitoring phones 14, for which, of course, a loudspeaker may be substituted, if desired. Plate potential for the tube 13 is provided by the current source 15. A source of reference signal 16 is provided. This may be a gassy vacuum tube or may be, as illustrated, a carbon microphone element, such as a chamber of carbon granules, which provides a signal of random characteristics and of a fairly uniform volume level. This microphone would not be provided with a diaphragm, and in addition may be encased in an appropriate sound-proof box, such as shown at 17, in order to prevent the picking up of any signal other than the noise produced by the carbon granules themselves. Current for the microphone is provided by the battery 18 and the output from the microphone is fed through the transformer 19 to the amplifier 20. This amplifier may be adjustable so that the output signal therefrom is of any predetermined value. The output from the amplifier 20 is fed through the transformer 21 to the earphones 14, where it is superposed on the signal from the recording amplifier 11. It will be apparent that in the arrangement described, the earphones 14 will receive both the reference signal from the source 16 and the signal to be recorded from the amplifier 11, and the latter may be adjusted in relation to the former until the proper value is attained. If a higher level of recorded signal is desired, the amplification of the amplifier 20 may be adjusted to give a correspondingly high reference level, and vice versa. As this system would ordinarily be used the recordist would not be particularly conscious of the background noise produced by the reference signal during average or loud incoming signals, but as soon as these become faint the recordist immediately notices the noise and is reminded that the gain should be increased.

Having now described my invention, I claim:

1. In combination, a recording channel including a recording amplifier, a recorder and a monitoring device connected to the output of said amplifier, a source of reference signal of substantially constant level, and means for applying said reference signal to said monitoring device, and means for excluding said reference signal from said recorder.

2. In combination, a recording channel including a recording amplifier, a recorder and a monitoring device connected to the output of said amplifier, a source of reference signal of substantially constant level, and means for applying said reference signal to said monitoring device while excluding said reference signal from said recorder.

3. The method of monitoring sounds in recording comprising the steps of directing signals corresponding to the sounds to be recorded to a monitoring device, producing a reference signal of predetermined level, and also directing said reference signal to said monitoring device.

4. The method of monitoring sounds in recording comprising the steps of diverting a portion of the sounds to be recorded to a monitoring device, producing a reference signal of predetermined level, directing said reference signal to said monitoring device, and adjusting the signals to be recorded in accordance with the relative amplitudes of the two signals in the said monitoring device.

5. The method of monitoring sounds in recording comprising the steps of directing signals corresponding to the sounds to be recorded to a monitoring device, producing a reference signal of predetermined level, directing said reference signal to said monitoring device, and adjusting the signals to be recorded in accordance with the relative amplitudes of the two signals in the said monitoring device.

EDWARD W. KELLOGG.